(12) United States Patent  (10) Patent No.: US 8,488,078 B2
Kim  (45) Date of Patent: Jul. 16, 2013

(54) CHASSIS FORMED OF INTERLOCKING PARTS AND DISPLAY DEVICE HAVING SAME

(75) Inventor: Yong-II Kim, Suwon-si (KR)

(73) Assignee: Samsung Display Co., Ltd. (KR)

(*) Notice: Subject to any disclaimer, the term of this patent is extended or adjusted under 35 U.S.C. 154(b) by 120 days.

(21) Appl. No.: 12/795,309

(22) Filed: Jun. 7, 2010

(65) Prior Publication Data

US 2010/0245710 A1 Sep. 30, 2010

Related U.S. Application Data

(63) Continuation of application No. 11/029,658, filed on Jan. 6, 2005, now abandoned.

(30) Foreign Application Priority Data

Jan. 7, 2004 (KR) .......................... 10-2004-0000900

(51) Int. Cl.
   *G02F 1/1333* (2006.01)
(52) U.S. Cl.
   USPC ............................................... 349/58; 349/56
(58) Field of Classification Search
   USPC ............................................... 349/58–60, 56
   See application file for complete search history.

(56) References Cited

U.S. PATENT DOCUMENTS

| 3,736,602 | A  | * | 6/1973 | Miller ........................... 5/176.1 |
| 2001/0003471 | A1 | * | 6/2001 | Lee et al. ........................ 349/58 |
| 2002/0080298 | A1 | * | 6/2002 | Fukayama ....................... 349/58 |
| 2002/0135294 | A1 |   | 9/2002 | Fujishiro et al. |

FOREIGN PATENT DOCUMENTS

| JP | 1988-128907   |   | 8/1988 |
| JP | 1994-006864   |   | 1/1994 |
| JP | 08-082788     |   | 3/1996 |
| JP | 2000-039850   | * | 2/2000 |
| JP | 2001-183627 A |   | 7/2001 |
| JP | 2001-249619   |   | 9/2001 |
| JP | 2002-227399   |   | 8/2002 |
| JP | 2002-290873 A |   | 10/2002 |
| JP | 2003-050549   |   | 2/2003 |
| JP | 2003-0304077  |   | 10/2003 |
| KR | 1020020031700 A |   | 5/2002 |
| TW | 354654        |   | 3/1999 |
| WO | 03083565      |   | 9/2003 |

* cited by examiner

*Primary Examiner* — Lauren Nguyen
(74) *Attorney, Agent, or Firm* — Innovation Counsel LLP (57) ABSTRACT

A chassis set includes a first chassis and a second chassis. The first chassis includes a first connecting portion having at least one guide protrusion. The second chassis includes a second connecting portion having at least one guide hole that receives the guide protrusion of the first chassis to combine the first and second chassis. Therefore, a manufacturing cost is reduced and productivity is enhanced. Additionally, the chassis can be made easily.

17 Claims, 9 Drawing Sheets

CHASSIS FORMED OF INTERLOCKING PARTS AND DISPLAY DEVICE HAVING SAME

CROSS-REFERENCE TO RELATED APPLICATIONS

This application is a continuation of and claims benefit of parent U.S. Ser. No. 11/029,658 filed Jan. 6, 2005 where the latter claims benefit of and relies for priority upon Korean Patent Application No. 2004-00900 filed on Jan. 7, 2004, and where the contents of said US parent and said Korean applications are herein incorporated by reference in their entireties.

FIELD OF THE INVENTION

The present invention relates to a chassis and a display device having the chassis. More particularly, the present invention relates to a chassis for a large display device and a display device having the chassis.

DESCRIPTION OF THE RELATED ART

A liquid crystal display (LCD) is a kind of flat panel displays. Compared to other flat panel displays, an LCD has many merits. It is thin and light. It can be driven with low voltages. It consumes less power than other displays. Therefore, LCDs are used in various fields.

Generally, an LCD includes a display unit that displays images on it, a backlight assembly that generates light and provides it to the display unit, and a top chassis that fixes the display unit to the backlight assembly.

The display unit includes an LCD panel. The LCD panel includes a thin film transistor (TFT) substrate, a color filter substrate, and a liquid crystal layer. The TFT substrate includes a plurality of pixel electrodes and a plurality of TFTs arranged in a matrix shape. The color filter substrate includes color filters facing the pixel electrodes, and a common electrode. The liquid crystal layer is interposed between the TFT substrate and the color filter substrate.

The backlight assembly includes a lamp, an optical member, and a receiving container. The lamp generates light. The optical member guides the light generated from the lamp to be used efficiently in the display unit. The receiving container receives the lamp and the optical member. The backlight assembly may be classified into an edge illumination type and a direct illumination type according to a position of the lamp.

The top chassis fixes the LCD panel to the backlight assembly. The top chassis is made of a strong material like stainless steel for an example. Upper portions of the top chassis surround the LCD panel and compress the LCD panel toward the backlight assembly. Side portions of the top chassis are combined with side portions of the receiving container. Therefore, the LCD panel is fixed to the backlight assembly. The top chassis may be formed by a pressing method.

Recently, display devices become bigger and bigger. Accordingly, LCD panels and chassis need to be bigger. The bigger chassis are made, the more material is wasted because of the pressing method. Therefore the productivity of the display decreases. Furthermore, when the top chassis of a large LCD is formed in one body, the top chassis may be easily twisted or deformed by heat or other forces so that a backlight assembly may not be fixed firmly with the display unit.

SUMMARY OF THE INVENTION

The present disclosure of invention provides for a chassis that can reduce manufacturing cost and increase quality of flat panel displays encased by the chassis.

The present disclosure of invention also provides for a flat panel display device having the above-mentioned chassis.

In an exemplary chassis according to the present invention, the chassis includes a first chassis and a second chassis. The first chassis includes a first connecting portion having at least one guide protrusion. The second chassis includes a second connecting portion having at least one guide hole that receives the guide protrusion of the first chassis to combine the first and the second chassis.

In another exemplary chassis according to the present invention, the chassis set includes first, second, third and fourth chassis. The first chassis includes a first connecting portion having a first guide protrusion and a second connecting portion having a second guide protrusion. The second chassis is disposed substantially parallel with the first chassis. The second chassis includes a third connecting portion having a third guide protrusion and a fourth connecting portion having a fourth guide protrusion. The third chassis includes a fifth connecting portion having a first guide hole that receives the first guide protrusion of the first chassis to combine the first and the third chassis and a sixth connecting portion having a second guide hole that receives the third guide protrusion to combine the second and the third chassis. The fourth chassis includes a seventh connecting portion having a third guide hole that receives the second guide protrusion of the first chassis to combine the first and the fourth chassis and an eighth connecting portion having a fourth guide hole that receives the fourth guide protrusion to combine the second and the fourth chassis.

In an exemplary display according to the present invention, the display includes a backlight assembly, an LCD panel, and a chassis set. The backlight assembly generates light. The LCD panel displays images by using the light that comes from the backlight assembly. The chassis set fixes the liquid crystal display panel to the backlight assembly. The chassis set includes first and second chassis combined with each other. The first chassis has a guide protrusion, and the second chassis has a guide hole that receives the guide protrusion.

The chassis may be a chassis piece, a chassis part, etc.

Therefore, an LCD can be made cheaper and a productivity of the display becomes better. Additionally, reliability of the chassis becomes better. Furthermore, the chassis is easily made.

DESCRIPTION OF EMBODIMENTS

Hereinafter the embodiments of the present invention will be described in detail with reference to the accompanied drawings.

Figure 1:
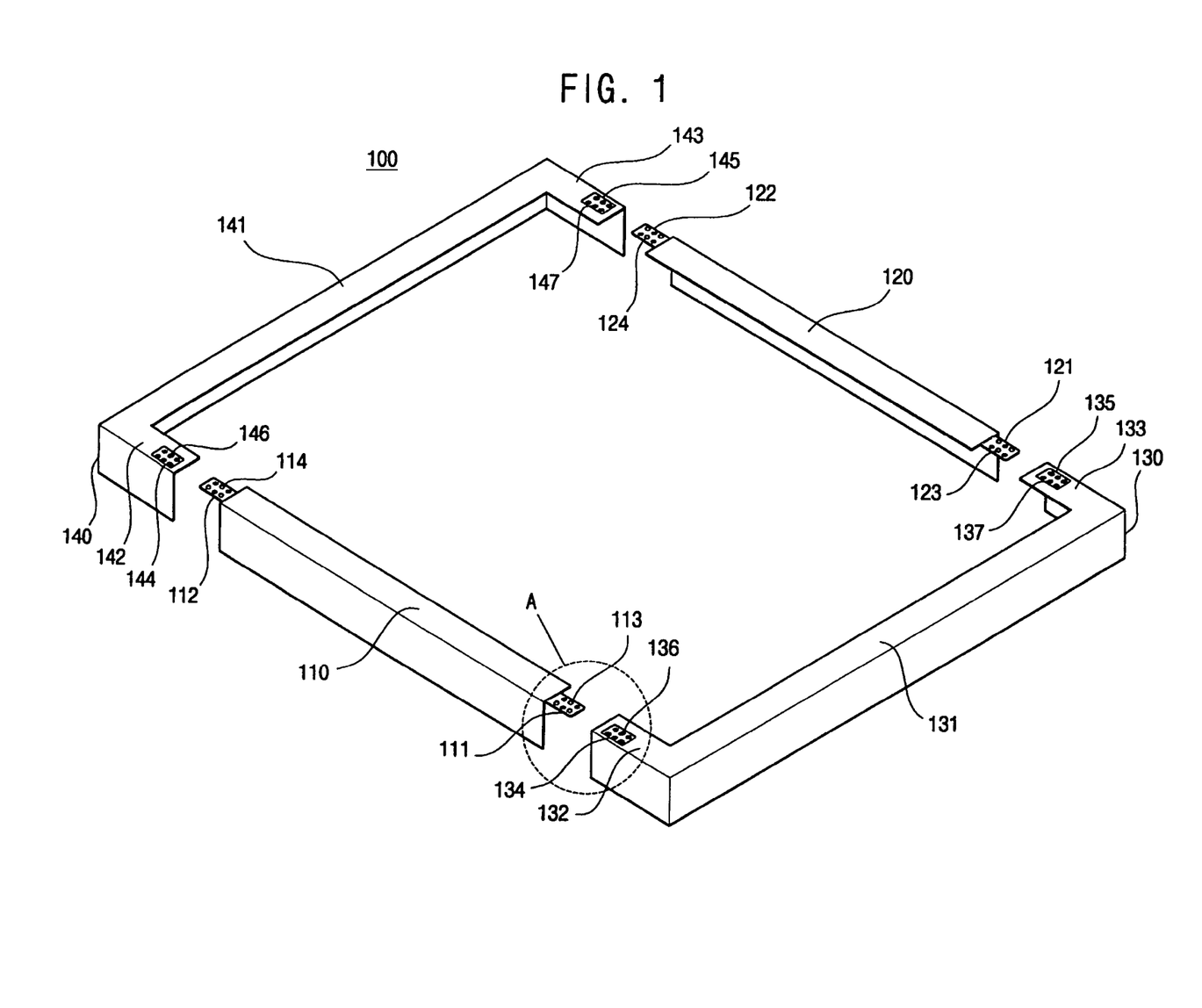
FIG. 1 is an exploded perspective view illustrating a chassis set according to an exemplary embodiment of the present invention.

FIG. 1 is an exploded perspective view illustrating a chassis set according to an exemplary embodiment of the present invention.

Referring to FIG. 1, a chassis set 100 according to an exemplary embodiment of the present invention includes the first chassis 110, the second chassis 120, the third chassis 130 and the fourth chassis 140.

The first chassis 110 includes the first connecting portion 111 and the second connecting portion 112. The first connecting portion 111 and second connecting portion 112 are opposite to each other. The first connecting portion 111 includes first guide protrusions 113 protruding upward. The second connecting portion 112 includes second guide protrusions 114 protruding upward. The second guide protrusions 114 have substantially same structure as that of the first guide protrusions 113.

The second chassis 120 is substantially parallel with the first chassis 110. The second chassis 120 includes third connecting portion 121 and fourth connecting portion 122. The third connection portion 121 and fourth connecting portion 122 are disposed opposite to each other. The third connecting portion 121 includes third guide protrusions 123 protruding upward. The fourth connecting portion 122 includes fourth guide protrusions 124 protruding upward. The third guide protrusion 123 and the fourth guide protrusion 124 have substantially same structure as that of the first guide protrusion 113 and second guide protrusion 114.

The third chassis 130 includes the first body portion 131, the second body portion 132, and the third body portion 133. The first body portion 131 is substantially perpendicular to the first chassis 110 and the second chassis 120. The second body portion 132 is extended from a first end of the first body portion 131 such that the second body portion 132 is substantially perpendicular to the first body portion 131. The second body portion 132 includes the fifth connecting portion 134. The fifth connecting portion 134 includes first guide holes 136. The first guide protrusions 113 of the first connecting portion 111 are inserted into the first guide holes 136 of the fifth connecting portion 134, so that the fifth connecting portion 134 is combined with the first connecting portion 111 of the first chassis 110. Therefore, the first chassis 110 and the third chassis 130 are combined with each other. The third body portion 133 is extended from a second end of the first body portion 131 such that the third body portion 133 is substantially perpendicular to the first body portion 131. The third body portion 133 includes the sixth connecting portion 135. The sixth connecting portion 135 includes the second guide holes 137. The third guide protrusions 123 of the third connecting portion 121 are inserted into the second guide holes 137 of the sixth connecting portion 135, so that the sixth connecting portion 135 is combined with the third connecting portion 121 of the second chassis 120. Therefore, the second chassis 120 and third chassis 130 are combined with each other.

The fourth chassis 140 includes the fourth body portion 141, the fifth body portion 142, and the sixth body portion 143. The fourth body portion 141 is substantially perpendicular to the first chassis 110 and the second chassis 120. The fifth body portion 142 is extended from the first end of the fourth body portion 141 such that the fifth body portion 142 is substantially perpendicular to the fourth body portion 141. The fifth body portion 142 includes a seventh connecting portion 144. The seventh connecting portion 144 includes third guide holes 146. The second guide protrusions 114 of the second connecting portion 112 are inserted into the third guide holes 146 of the seventh connecting portion 144, so that the seventh connecting portion 144 is combined with the second connecting portion 112 of the first chassis 110. Therefore, the first chassis 110 and the fourth chassis 140 are combined with each other. The sixth body portion 143 is extended from a second end of the fourth body portion 141 such that the sixth body portion 143 is substantially perpendicular to the fourth body portion 141. The sixth body portion 143 includes an eighth connecting portion 145. The eighth connecting portion 145 includes fourth guide holes 147. The fourth guide protrusions 124 of the fourth connecting portion 122 are inserted into the fourth guide holes 147 of the eighth connecting portion 145, so that the eighth connecting portion 145 is combined with the fourth connecting portion 122 of the second chassis 120. Therefore, the second chassis 120 and the fourth chassis 140 are combined with each other.

According to the present embodiment, the first chassis 110, second chassis 120, third chassis 130, and fourth chassis 140 are combined to one another to form the chassis set 100 having a rectangular shape.

Figure 2:
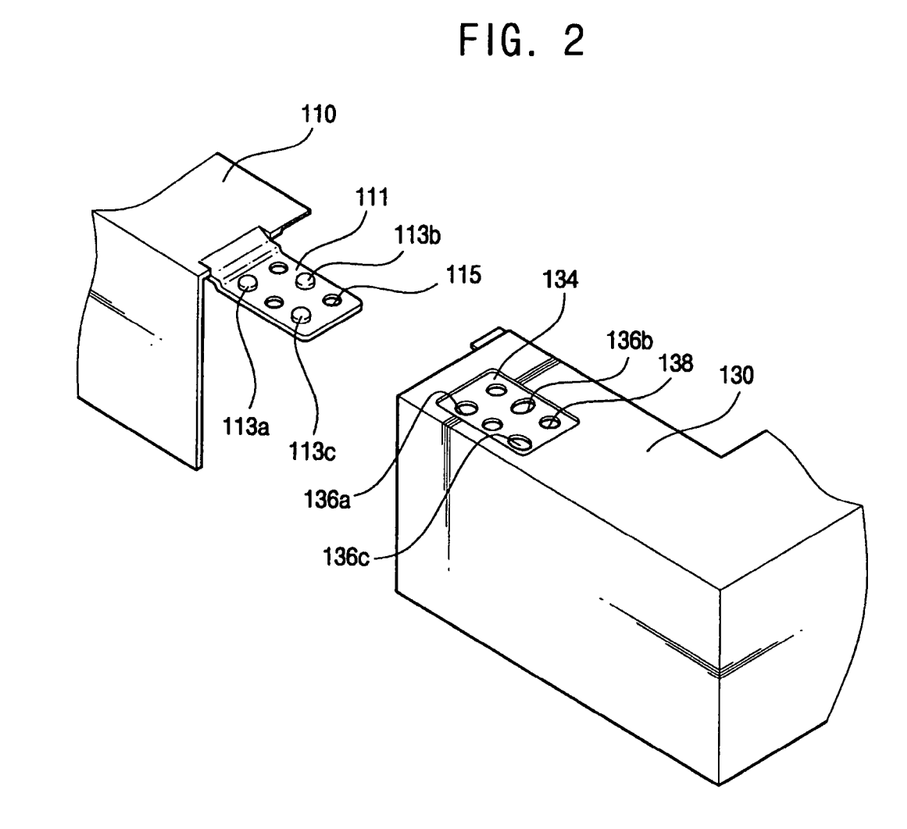
FIG. 2 is an enlarged view illustrating the portion 'A' in FIG. 1.
Figure 3:
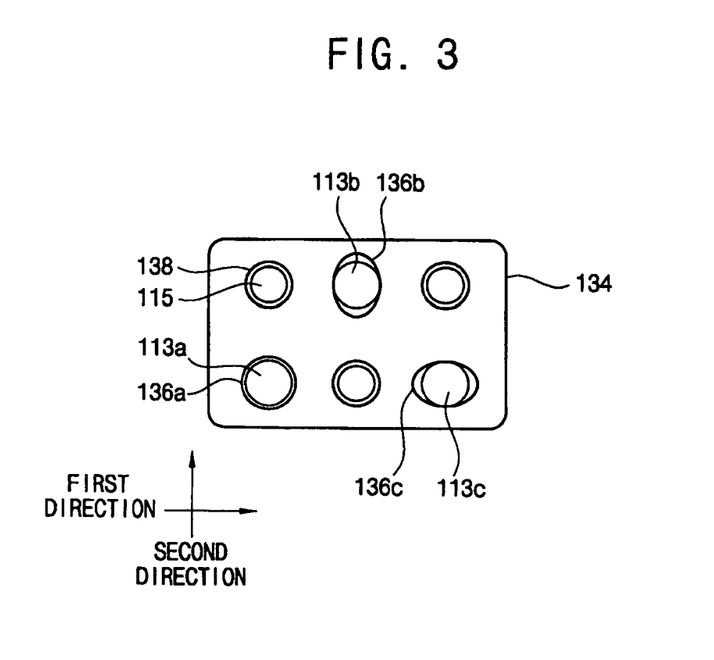
FIG. 3 is a plan view illustrating a combination of a first connecting portion and a fifth connecting portion in FIG. 2.

FIG. 2 is an enlarged view illustrating a portion 'A' in FIG. 1, and FIG. 3 is a plan view illustrating a combination of a first connecting portion and a fifth connecting portion in FIG. 2.

Referring to FIGS. 2 and 3, the first chassis 110 and the second chassis 130 are combined with each other through the first connecting portions 111 and the fifth connecting portions 134.

The first connecting portion 111 includes the first guide protrusions 113. The first guide protrusions 113 include the first protrusion 113a, the second protrusion 113b, and the third protrusion 113c. The protrusions 113a, 113b, and 113c may have substantially identical shape. The protrusions 113a, 113b and 113c have, for example, a circular cross-sectional shape.

The fifth connecting portion 134 includes the first guide holes 136. The first guide holes 136 include first hole 136a, second hole 136b, and third hole 136c. The holes 136a, 136b and 136c receive the protrusions 113a, 113b and 113c, respectively. That is, the protrusions 113a, 113b and 113c are inserted into the holes 136a, 136b and 136c, respectively.

The first hole 136a has a circular shape such that the first hole 136 corresponds to the first protrusion 113a. The first hole 136a has a diameter that is slightly greater than the diameter of the first protrusion 113a. Therefore, the first protrusion 113a is inserted into the first hole 136a so that the first protrusion 113a is fixed to the first hole 136a by the first hole 136a.

The second hole 136b has, for example, an oval shape having a major axis that is substantially parallel with a first direction. The first direction is substantially perpendicular to a longitudinal direction of the first chassis 110. The second hole 136b prevents the second protrusion 113b from moving along a second direction that is substantially perpendicular to the first direction. Therefore, the second hole 136b guides the first chassis 110 to be disposed at a proper position along the second direction that corresponds to a longitudinal direction of the first chassis 110.

The third hole 136c has, for example, an oval shape having a major axis that is substantially parallel with the second direction. The third hole 136c prevents the third protrusion 113c from moving along the first direction. Therefore, the third hole 136c guides the first chassis 110 to be disposed at a proper position along the first direction that corresponds to a longitudinal direction of the third chassis 130.

Therefore, the holes 136a, 136b and 136c guide the first chassis 110 to be properly disposed.

Alternatively, the first guide protrusions 113 may include only one protrusion and the first guide holes 136 may include only one hole corresponding to the protrusion. Alternatively, the first guide protrusions 113 and the first guide holes 136 may include a plurality of protrusions.

Additionally, the first guide protrusions 113 and the first guide holes 136 may have other shape. The first guide protrusions 113 and the first guide holes 136 may have a polygonal shape such as a rectangular shape.

The first connecting portion 111 further includes at least one first combination hole 115, and the fifth connecting portion 134 further includes at least one first through-hole 138 corresponding to the first combination hole 115.

When the first connecting portion 111 and the fifth connecting portion 134 are temporarily combined with each other by the first guide protrusions 113 and the first guide holes 136, the first connecting portion 111 and the fifth connecting portion 134 are permanently combined with each other through a screw penetrating the first combination hole 115 and the first through-hole 138.

The first connecting portion 111 and the fifth connecting portion 134 are permanently combined with each other, for example, through a spot welding, etc.

Figure 4:
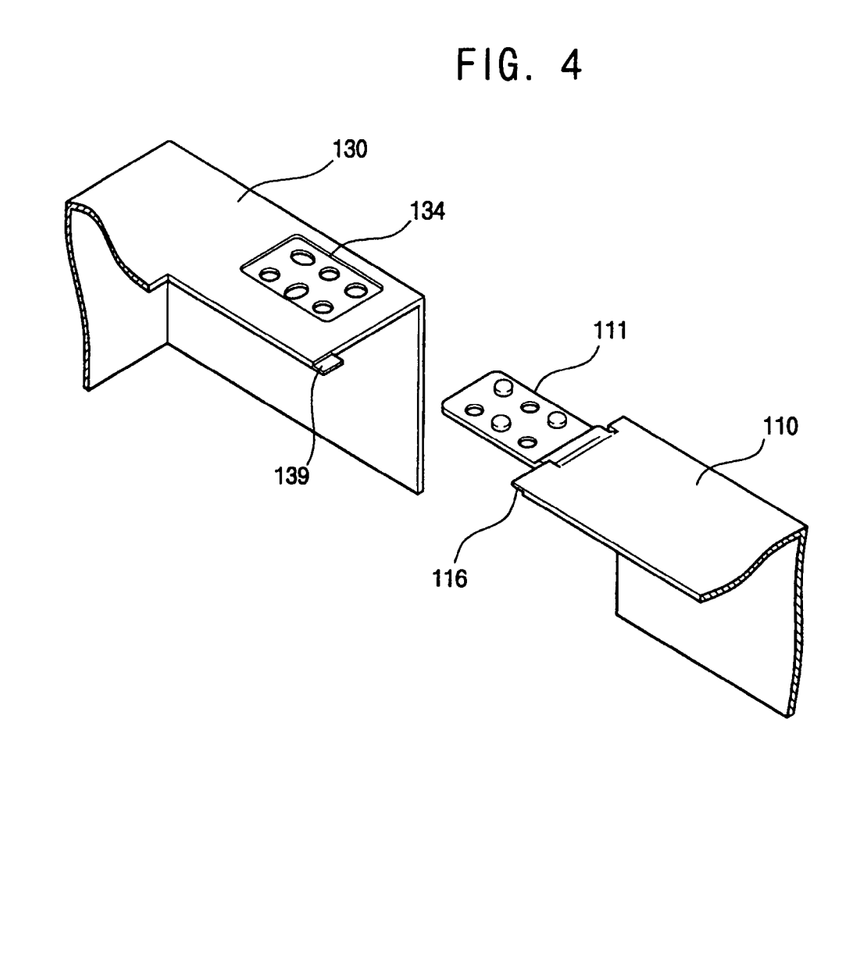
FIG. 4 is a perspective view showing a first chassis and a third chassis in FIG. 2.
Figure 5:
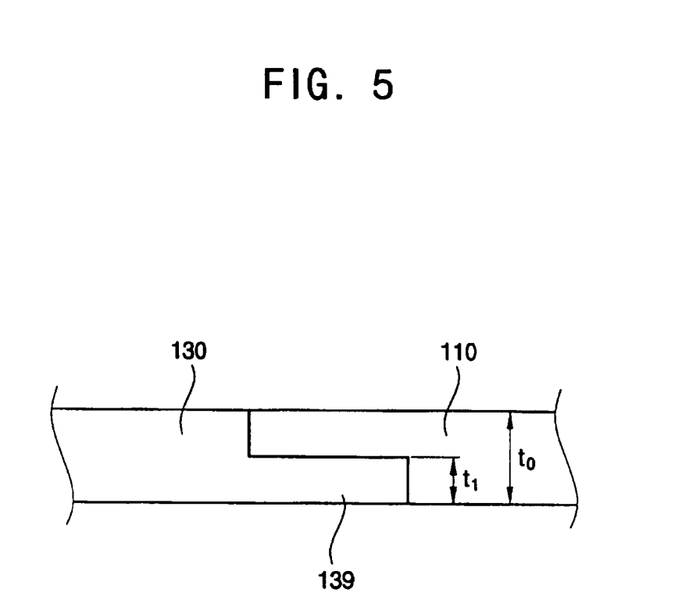
FIG. 5 is a cross-sectional view illustrating a combination between the first and the third chassis in FIG. 4.

FIG. 4 is a perspective view shown from a first chassis and a third chassis in FIG. 2, and FIG. 5 is a cross-sectional view illustrating a combination between the first and third chassis in FIG. 4.

Referring to FIGS. 4 and 5, the first chassis 110 may further include a first recessed portion (or a first inverse stepped portion) 116. The first recessed portion 116 is formed at end portions of the first chassis 110. The first chassis 110 has a thickness $t_0$, and a lower portion is removed by a thickness $t_1$ to form the first recessed portion 116.

The third chassis 130 further includes a first protruding portion (or first stepped portion) 139. The first protruding portion 139 is protruded from an end portion of the third chassis 130 to have a stepped portion. The first protruding portion 139 has a thickness $t_1$ that is substantially same as the recessed length or the first recessed portion 116 such that the first protruding portion 139 fits to the first recessed portion 116.

A contacting surface of the first recessed portion 116 and the first protruding portion 139 may be inclined with respect to an upper surface of the chassis 110 and 130.

The first protruding portion 139 absorbs impact applied from outside of the display 300. The first protruding portion 139 and the recessed portion 116 may be extended along the end portion to prevent light from leaking through a border between the first and the third chassis.

Figure 6:
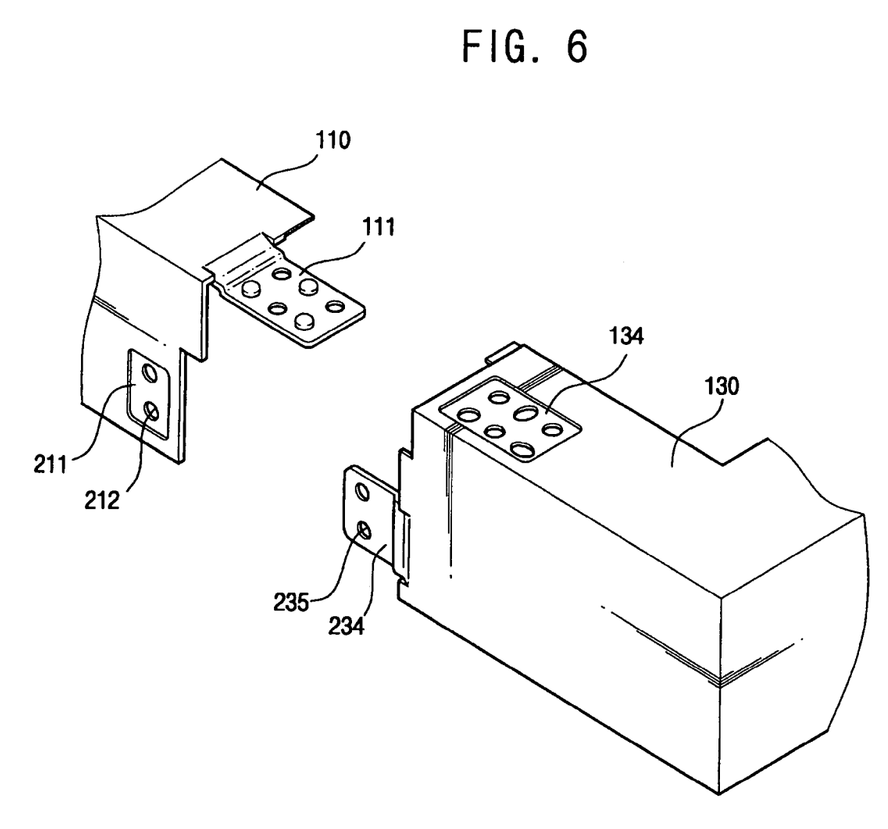
FIG. 6 is a perspective view illustrating a combination between the first and the third chassis in accordance with another exemplary embodiment.

FIG. 6 is a perspective view illustrating a combination between the first chassis and third chassis in accordance with another exemplary embodiment.

Referring to FIG. 6, a first chassis 110 includes a first connecting portion 111 formed along an upper face of the first chassis 110, and a ninth connecting portion 211 formed along a side face of the first chassis 110. A third chassis 130 includes a fifth connecting portion 134 formed along an upper face of the third chassis 130, and a tenth connecting portion 234 formed along a side face of the third chassis 130. The first connecting portion 111 and the fifth connecting portions 134 have substantially same structure as that in FIG. 2. Therefore, any further explanations will be omitted.

The ninth connecting portion 211 and tenth connecting portion 234 include at least one second through-hole 212 and at least one second combination hole 235 for screwing the second through-hole 212 to the second combination hole 235. The second combination hole 235 corresponds to the second through-hole 212.

The tenth connecting portion 234 may further include a guide protrusion (not shown), and the ninth connecting portion 211 may further include a guide hole that receives the guide protrusion.

Therefore, the first chassis 110 and the third chassis 130 are combined more tightly through the first and the fifth connecting portions formed along the upper face of the chassis 110 and 130 and the ninth and the tenth connecting portions formed along the side face of the chassis 110 and 130.

Hereinbefore, a combination between the chassis 110 and 130 is explained referring to FIGS. 2, 3, 4, 5, and 6. A combination between the first and fourth chassis 110 and 140, a combination between the second and third chassis 120 and 130, and a combination between the second and fourth chassis 120 and 140 are substantially same as that of the first and third chassis 110 and 130. Therefore, any further explanations will be omitted.

According to the present embodiment, the chassis set 100 includes four pieces of first to fourth chassis 110, 120, 130 and 140. Therefore, the remnants of material that is used to form the top chassis decrease to reduce manufacturing cost and enhance productivity.

Figure 7:
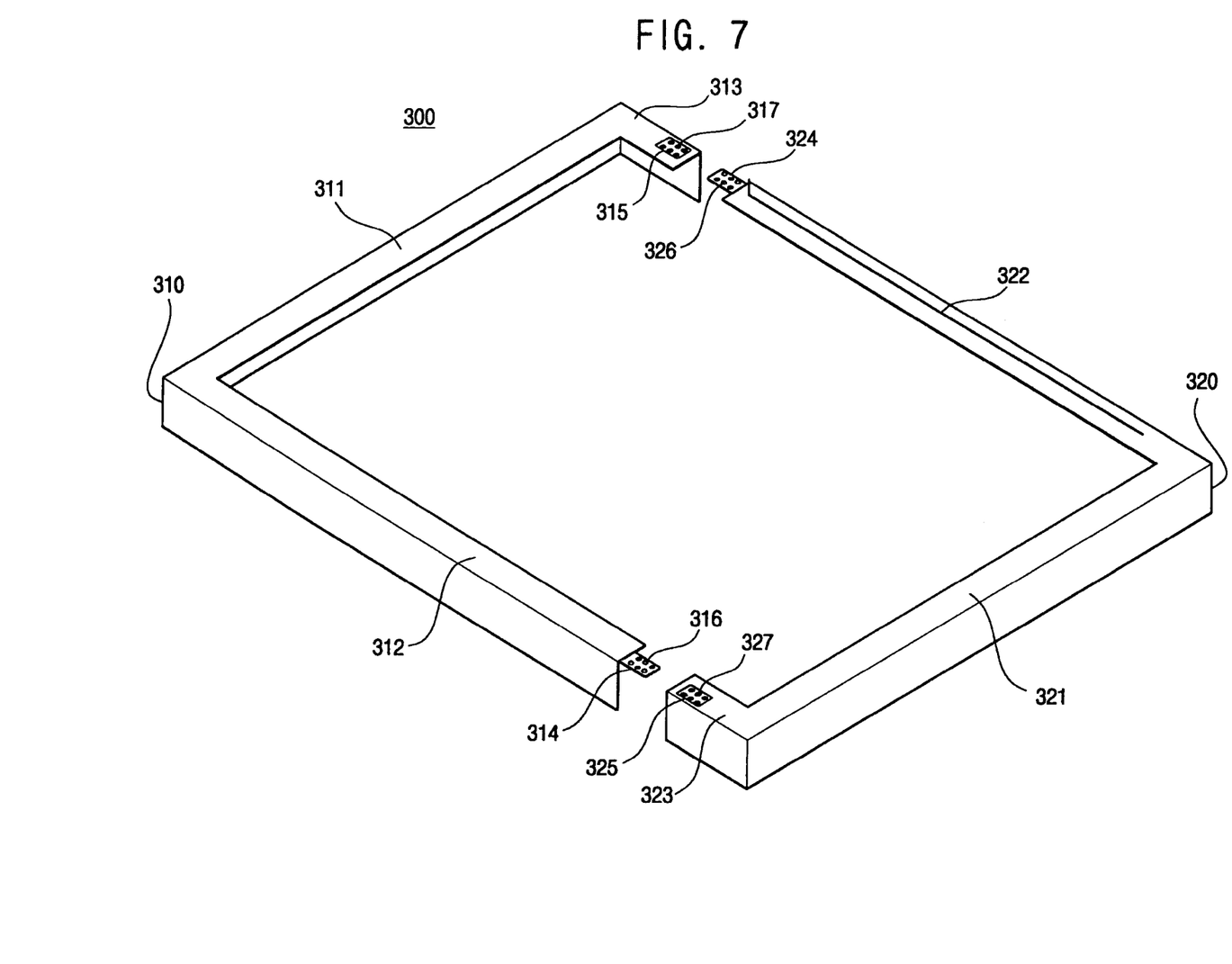
FIG. 7 is a perspective view illustrating a chassis set according to another exemplary embodiment of the present invention.

FIG. 7 is a perspective view illustrating a chassis set according to another exemplary embodiment of the present invention.

Referring to FIG. 7, a chassis set 300 according to the present embodiment includes a first chassis 310 and a second chassis 320.

The first chassis 310 includes the first body portion 311, the second body portion 312, and the third body portion 313. The second body portion 312 is extended from a first end of the first body portion 311 such that the second body portion 312 is substantially perpendicular to the first body portion 311. The third body portion 313 is extended from a second end of the first body portion 311 such that the third body portion 313 is substantially parallel with the second body portion 312. The second body portion 312, for example, is longer than the third body portion 313. Alternatively, the second and the third body portions may have substantially same length as each other.

The second body portion 312 includes a first connecting portion 314. The first connecting portion 314 includes first guide protrusions 316. The first connecting portion 314 has a substantially same structure as the first connecting portion 111 described in FIGS. 2 and 3.

The third body portion 313 includes a second connecting portion 315. The second connecting portion 315 includes first guide holes 317. The second connecting portion 315 has a substantially same structure as the fifth connecting portion 134 described in FIGS. 2 and 3.

The second chassis 320 includes the fourth body portion 321, the fifth body portion 322, and the sixth body portion 323. The fourth body portion 321 is disposed such that the fourth body portion 321 is substantially parallel with the first body portion 311 of the first chassis 310. The fifth body portion 322 is extended from a first end of the fourth body portion 321 such that the fifth body portion 322 is substantially perpendicular to the fourth body portion 321. The sixth body portion 323 is extended from a second end of the fourth body portion 321 such that the sixth body portion 323 is substantially parallel with the fifth body portion 322. The fifth body portion 322, for example, is longer than the sixth body portion 323. Alternatively, the fifth and the sixth body portions may have substantially same length as each other.

The fifth body portion 322 includes a third connecting portion 324. The third connecting portion 324 includes second guide protrusions 326. The third connecting portion 314 has substantially same structure as the first connecting portion 314.

The sixth body portion 323 includes a fourth connecting portion 325. The fourth connecting portion 325 includes second guide holes 327. The fourth connecting portion 325 has substantially same structure as the second connecting portion 315.

Figure 8:
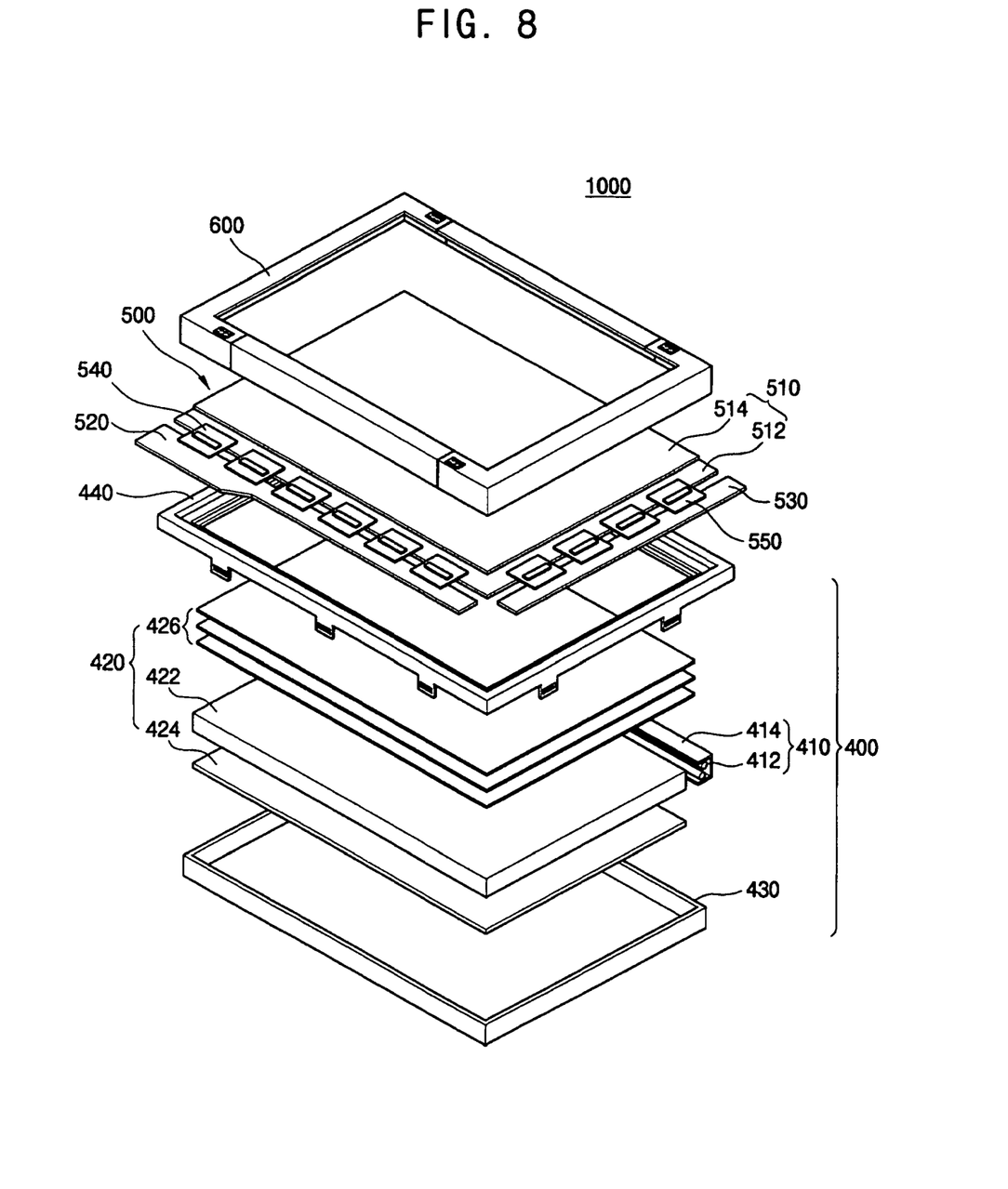
FIG. 8 is an exploded perspective view illustrating a liquid crystal display according to an exemplary embodiment of the present invention.

FIG. 8 is an exploded perspective view illustrating a liquid crystal display according to an exemplary embodiment of the present invention.

Referring to FIG. 8, a liquid crystal display (LCD) 1000 according to the present embodiment includes a backlight assembly 400, a display unit 500, and a chassis 600.

The chassis set 600 may be one of chassis sets in FIGS. 1 to 7. That is, the chassis set 600 includes two or more pieces combined together to form a rectangular shape. Therefore, any further explanation will be omitted.

The backlight assembly 400 includes a lamp unit 410 that generates light, an optical member 420 that modifies the transfer paths and/or the polarization of the light, and a receiving container 430 that receives the lamp unit 410 and the optical member 420.

The lamp unit 410 includes at least one lamp 412 and a lamp reflector 414. The lamp reflector 414 reflects light generated from the lamp 412 toward a light guide plate 422 of the optical member 420. The lamp unit 410 may be disposed at one side of the light guide plate 422. Alternatively, two lamp units 410 may be disposed at two side faces opposite to each other.

A cold cathode fluorescent lamp (CCFL) may be employed as the lamp 412. The lamp reflector 414 may include a material having good optical reflectivity. Alternatively, the lamp reflector 414 may have a reflecting layer coated thereon. The lamp reflector 414 reflects light generated from the lamp 412 toward the light guide plate 422 to enhance luminance.

The optical member 420 includes the light guide plate 422, a light reflecting sheet 424 and an optical sheet 426.

The light guide plate 422 modifies path of the light generated from the lamp 412. That is, the light generated from the lamp 412 enters the light guide plate 422 through a side face, and exits the light guide plate 422 through an upper face. The light guide plate 422 may further include light reflecting patterns (not shown) formed on a lower face in order to increase an amount of light that exits the light guide plate 422 through the upper face.

The light-reflecting sheet 424 is disposed under the light guide plate 422. The light-reflecting sheet 424 reflects light that leaks from the light guide plate 422 through the lower face toward the light guide plate 422. The light reflecting sheet 424 may include a material having a good optical reflectivity. Alternatively, the light reflecting sheet 424 may include a thin film that has a good optical reflectivity and is coated on a base film of the light reflecting sheet 424.

The optical sheet 426 is disposed on the light guide plate 422. The optical sheet 426 enhances optical characteristics such as a luminance and uniformity of luminance. The optical sheet 426 may include a light-diffusing sheet that enhances the uniformity of luminance. The optical sheet 426 may include a prism sheet that enhances luminance. The backlight assembly 400 may not include the optical sheet 426.

The receiving container 430 includes a bottom portion and a side portion extended from edge portions of the bottom portion to define a receiving space. The receiving container 430 receives the lamp unit 410 and the optical member 420 in sequence.

The backlight assembly 400 may further include a fixing member 440 on the optical sheet 440. The fixing member 440 is combined with the receiving container 430 to fix the optical member 420 to the receiving container 430. The fixing member 440 may include plastic or a material of the chassis 600. The fixing member 440 may include a plurality of pieces such as the chassis 600.

The backlight assembly 400 in FIG. 8 corresponds to an edge illumination type backlight assembly. Alternatively, the LCD 1000 may employ a direct illumination type backlight assembly having a plurality of lamps arranged on a receiving container.

The display unit 500 is disposed on the fixing member 440. The display unit 500 includes an LCD panel 510 that displays images by using the light provided from the backlight assembly 400, a data printed circuit board (PCB) 520, and a gate PCB 530 for driving the LCD panel 510.

Driving signals that come from the data PCB 520 and the gate PCB 530 are applied to the LCD panel 510 through a data flexible printed circuit (FPC) 540 and a gate flexible printed circuit 550 respectively.

Each of the data FPC 540 and the gate FPC 550 can be substituted by a tape carrier package (TCP) or a chip on film (COF).

The data FPC 540 may carry a data driver chip, and the gate FPC 550 may carry a gate driver chip. The data driver chip and the gate driver chip apply the driving signals to the LCD panel 510.

The LCD panel 510 includes a thin film transistor (TFT) substrate 512, a color filter substrate 514 facing the TFT substrate 512 and a liquid crystal layer (not shown) interposed between the TFT substrate 512 and the color filter substrate 514.

The TFT substrate 512 includes a glass substrate having a plurality of TFTs formed thereon. The TFTs are arranged in a matrix shape. Each of the TFTs includes a source electrode that is electrically connected to one of source lines, a gate electrode that is electrically connected to one of gate lines, and a drain electrode that is electrically connected to a pixel electrode. The pixel electrode can include an optically transparent and electrically conductive material such as ITO, IZO, etc., and the pixel electrode can also include an optically opaque and electrically conductive materials such as Al, Cr, etc.

The color filter substrate 514 includes a glass substrate having red, green and blue color filters formed thereon. The color filter substrate 514 may include a common electrode including optically transparent and electrically conductive material such as ITO, IZO, etc.

When a gate voltage is applied to the gate electrode of the TFT, the TFT is turned on, so that a pixel voltage is applied to the pixel electrode through the TFT. Therefore, electric fields are formed between the pixel electrode of the TFT substrate 512 and the common electrode of the color filter substrate 514.

When electric fields are applied to the liquid crystal between the pixel electrode and the common electrode, molecules of the liquid crystal are rearranged to change optical transmittance to display black and white images. The black and white images are converted into color images by the color filters of the color filter substrate 514.

The data PCB 520 is combined with the TFT substrate 512 through the data TCP 540, so that data signals are applied to the data lines formed on the TFT substrate 512 through the data PCB 520 and the data TCP 540.

The gate PCB 530 is combined with the TFT substrate 512 through the gate TCP 550, so that gate signals are applied to the gate lines formed on the TFT substrate 512 through the gate PCB 530 and the gate TCP 550.

The data PCB 520 is disposed along a longitudinal side of the TFT substrate 512, and the gate PCB 530 is disposed along a horizontal side of the TFT substrate 512.

In FIG. 8, the data PCB 520 and the gate PCB 530 are separately formed. Alternatively, the data PCB 520 and the gate PCB 530 are integrally formed.

The display unit 500 is fixed through a combination between the chassis set 600 and the receiving container 430.

Figure 9:
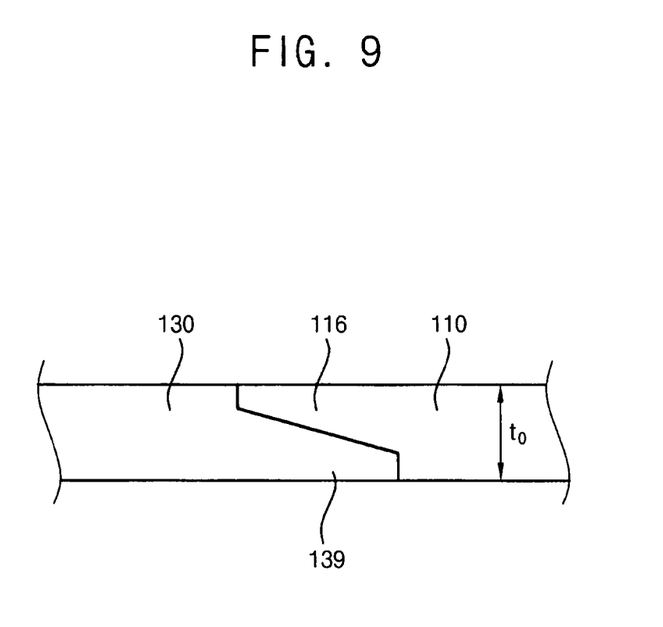
FIG. 9 is a cross-sectional view illustrating a combination between the first and the third chassis according to another exemplary embodiment of the present invention.

FIG. 9 is a cross-sectional view illustrating a combination between the first and the third chassis of a chassis set according to another exemplary embodiment of the present invention. The chassis set in FIG. 9 may be same as one of chassis sets in FIGS. 1 to 7 except the combination. Therefore, any further explanation will be omitted.

Referring to FIGS. 4 and 9, the first chassis 110 further includes a first recessed portion (or a first inverse stepped portion) 116. The first recessed portion 116 is formed at end portions of the first chassis 110. The first chassis 110 has a thickness $t_0$, and a lower portion is removed to form the first recessed portion 116. In this exemplary embodiment, an interface between the first recessed portion 116 and a first protruding portion 139 is inclined with respect to a surface of the first chassis 110 and a surface of the third chassis 130. Therefore, an impact that is provided from an exterior to the chassis set may be absorbed at the inclined interface between the first chassis 110 and the third chassis 130.

According to the present invention, the chassis set includes a plurality of chassis combined with each other to reduce manufacturing cost and enhance productivity.

Additionally, one chassis includes guide protrusions and other chassis that is combined with the chassis includes guide holes that correspond to the guide protrusions.

Having described the exemplary embodiments of the present invention and its advantages, it is noted that various changes, substitutions and alterations can be made herein without departing from the spirit and scope of the present disclosure.

What is claimed is:

1. A chassis adapted for encasing a pre-defined display device having an upper surface on which an image can be displayed, the chassis comprising:
    a first chassis part comprising a first upper plate having a respective first major surface extending in a first direction, the first chassis part also comprising a first side plate extending from an edge of the first upper plate in a second direction substantially perpendicular to the first direction of the first major surface of the first upper plate; and
    a second chassis part combined with the first chassis part and comprising a second upper plate having a respective second major surface extending in the first direction, the second chassis part also comprising a second side plate extending from an edge of the second upper plate in the second direction which is substantially perpendicular to the first direction of the second major surface of the second upper plate,
    the first upper plate comprising a first upper connecting portion, the first side plate comprising a first side connecting portion,
    the second upper plate comprising a second upper connecting portion combinable with the first upper connecting portion, the second side plate comprising a second side connecting portion combinable with the first side connecting portion;
    wherein the first upper connecting portion comprises one or more guide protrusions protruding in a direction substantially perpendicular to the first major surface (thus causing the one or more guide protrusions to be not coplanar with the first major surface), and
    wherein the second upper connecting portion comprises a corresponding one or more guide holes each disposed and adapted to receive and substantially surround a corresponding one of the guide protrusions when the first and second chassis parts are combined.

2. The chassis of the claim 1, wherein the second side connecting portion is configured to have one or more side protrusions protruding therefrom in a direction substantially perpendicular to the second direction, and the first side connecting portion comprises a corresponding one or more side holes each adapted to receive a corresponding one of the side protrusions.

3. The chassis of the claim 1, wherein the guide holes comprise a first guide hole and a second guide hole having a different shape from that of the first guide hole.

4. The chassis of the claim 1, wherein the guide holes comprise a first guide hole having an oval shape and a second guide hole having an oval shape, said oval shape of the second guide hole having a major axis extending in a different direction from a major axis of the oval shape of the first guide hole.

5. The chassis of the claim 4, wherein the major axis of the second guide hole extends in a direction substantially perpendicular to the major axis of the first guide hole.

6. The chassis of the claim 1, wherein the guide protrusions protrude in a direction substantially perpendicular to the second major surface which is an upper surface of the second upper plate.

7. The chassis of the claim 1, wherein the first upper connecting portion extends to be disposed under the second upper connection portion.

8. The chassis of the claim 7, wherein the second upper plate substantially covers the first upper connecting portion so that an upper surface of the first upper connecting portion of the first upper plate is thereby substantially coupled to the second upper plate.

9. The chassis of the claim 8, wherein the first side plate substantially covers the second side connecting portion so that a surface of the first side plate is thereby substantially coupled to the second side plate.

10. A display device comprising:
    a display panel having an upper surface on which an image can be displayed; and
    a chassis encasing the display panel, the chassis comprising:
    a first chassis part comprising a first upper plate having a respective first major surface extending in a first direction, the first chassis part also comprising a first side plate extending from an edge of the first upper plate in a second direction substantially perpendicular to the first direction of the first major surface of the first upper plate; and a second chassis part combined with the first chassis part and comprising a second upper plate having a respective second major surface extending in the first direction, the second chassis part also comprising a second side plate extending from an edge of the second upper plate in the second direction which is substantially perpendicular to the first direction of the second major surface of the second upper plate, the first upper plate comprising a first upper connecting portion, the first side plate comprising a first side connecting portion, the second upper plate comprising a second upper connecting portion combinable with the first upper connecting portion, the second side plate comprising a second side connecting portion combinable with the side connecting portion;

wherein the first upper connecting portion comprises one or more guide protrusions protruding in a direction substantially perpendicular to the first major surface (thus causing the one or more guide protrusions to be not coplanar with the first major surface), and wherein the second upper connecting portion comprises a corresponding one or more guide holes each disposed and adapted to receive and substantially surround a corresponding one of the guide protrusions when the first and second chassis parts are combined.

11. The chassis of the claim 10, wherein the guide holes comprise a first guide hole and a second guide hole having a different shape from that of the first guide hole.

12. The chassis of the claim 10, wherein the guide holes comprise a first guide hole having an oval shape and a second guide hole having an oval shape, said oval shape of the second guide hole having a major axis extending in a different direction from a major axis of the oval shape of the first guide hole.

13. The chassis of the claim 10, wherein the first upper connecting portion extends to be disposed under the second upper connection portion.

14. A method for manufacturing a display device having an upper surface on which an image can be displayed, the method comprising:

preparing a first chassis part comprising a first upper plate having a respective first major surface extending in a first direction, the first chassis part also comprising a first side plate extending from an edge of the first upper plate in a second direction substantially perpendicular to the first direction of the first major surface of the first upper plate, the first side plate comprising a first side connecting portion;

preparing a second chassis part adapted to be combined with the first chassis part and comprising a second upper plate and a second side plate extending from an edge of the second upper plate in a direction substantially perpendicular to the second upper plate, the second upper plate comprising a second upper connecting portion, the second side plate comprising a second side connecting portion;

wherein the first upper connecting portion comprises one or more guide protrusions protruding in a direction substantially perpendicular to the first major surface (thus causing the one or more guide protrusions to be not coplanar with the first major surface), and wherein the second upper connecting portion comprises a corresponding one or more guide holes each disposed and adapted to receive and substantially surround a corresponding one of the guide protrusions when the first and second chassis parts are connected;

connecting the first upper connecting portion to the second upper connecting portion and connecting the first side connecting portion to the second side connecting portion to thereby combine the first chassis part with the second chassis part to form a chassis; and using the chassis to encase the display panel.

15. The method of claim 14, wherein the guide holes comprise a first guide hole having an oval shape and a second guide hole having an oval shape, said oval shape of the second guide hole having a major axis extending in a different direction from a major axis of the oval shape of the first guide hole.

16. The method of the claim 14, wherein the first upper connecting portion extends to be disposed under the second upper connection portion.

17. The method of the claim 14, wherein the first upper connecting portion is connected to the second upper connection portion through spot welding.

\* \* \* \* \*